United States Patent
Dolzinski et al.

(10) Patent No.: US 9,315,252 B2
(45) Date of Patent: Apr. 19, 2016

(54) COMPOSITE, AIRCRAFT OR SPACECRAFT, AND METHOD

(71) Applicant: AIRBUS OPERATIONS GMBH, Hamburg (DE)

(72) Inventors: Wolf-Dietrich Dolzinski, Ganderkesee (DE); Michael Kolax, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/857,439

(22) Filed: Apr. 5, 2013

(65) Prior Publication Data

US 2013/0295322 A1    Nov. 7, 2013

Related U.S. Application Data

(63) Continuation of application No. PCT/EP2011/067580, filed on Oct. 7, 2011.

(60) Provisional application No. 61/391,334, filed on Oct. 8, 2010.

(30) Foreign Application Priority Data

Oct. 8, 2010    (DE) .......................... 10 2010 042 186

(51) Int. Cl.
*B64C 1/06*    (2006.01)
*B64C 1/10*    (2006.01)

(52) U.S. Cl.
CPC ................. *B64C 1/064* (2013.01); *B64C 1/061* (2013.01); *B64C 1/10* (2013.01); *Y10T 428/24174* (2015.01)

(58) Field of Classification Search
CPC ... B64C 1/00; B64C 3/182; B64C 1/06–1/12; B32B 2605/18; Y10T 428/24174
USPC .............................. 428/119; 156/92; 244/119
See application file for complete search history.

(56) References Cited

U.S. PATENT DOCUMENTS 2,389,767 A * 11/1945 Dalton ....................... 52/506.06
5,242,523 A    9/1993 Willden (Continued)

FOREIGN PATENT DOCUMENTS

CN            101795850        8/2010
DE        10 2006 060364        6/2008

(Continued)

OTHER PUBLICATIONS

Zweben, Carl, Ph.D., Stronger and Lighter—Composites Make Their Mark, Mar. 20, 2008, MachineDesign.com, http://machinedesign.com/news/stronger-and-lighter-composites-make-their-mark.*
International Search Report and Written Opinion for Application No. PCT/EP2011/067580 dated Jan. 26, 2012.

(Continued)

*Primary Examiner* — Maria Veronica Ewald
*Assistant Examiner* — Brian Handville
(74) *Attorney, Agent, or Firm* — Jenkins, Wilson, Taylor & Hunt, P.A.

(57) ABSTRACT

The present invention provides a composite for an aircraft or spacecraft, comprising: a skin portion; a stringer which is attached to the skin portion; and a former made from fibre composite material, which is attached to the skin portion and forms an opening therewith, through which the stringer extends, substantially transverse to the former.

8 Claims, 1 Drawing Sheet

(56) References Cited

U.S. PATENT DOCUMENTS

| | | |
|---|---|---|
| 8,556,213 B2 | 10/2013 | Markowski et al. |
| 2007/0095982 A1 | 5/2007 | Kismarton |
| 2008/0179461 A1 | 7/2008 | Roming |
| 2009/0057487 A1 | 3/2009 | Velicki |
| 2009/0272846 A1 | 11/2009 | Anast |

FOREIGN PATENT DOCUMENTS

| | | |
|---|---|---|
| WO | WO 2009/030731 | 3/2009 |
| WO | WO 2012/045871 | 4/2012 |

OTHER PUBLICATIONS

Chinese Office Action for Application No. 201180047944.9 dated Oct. 21, 2014.

\* cited by examiner

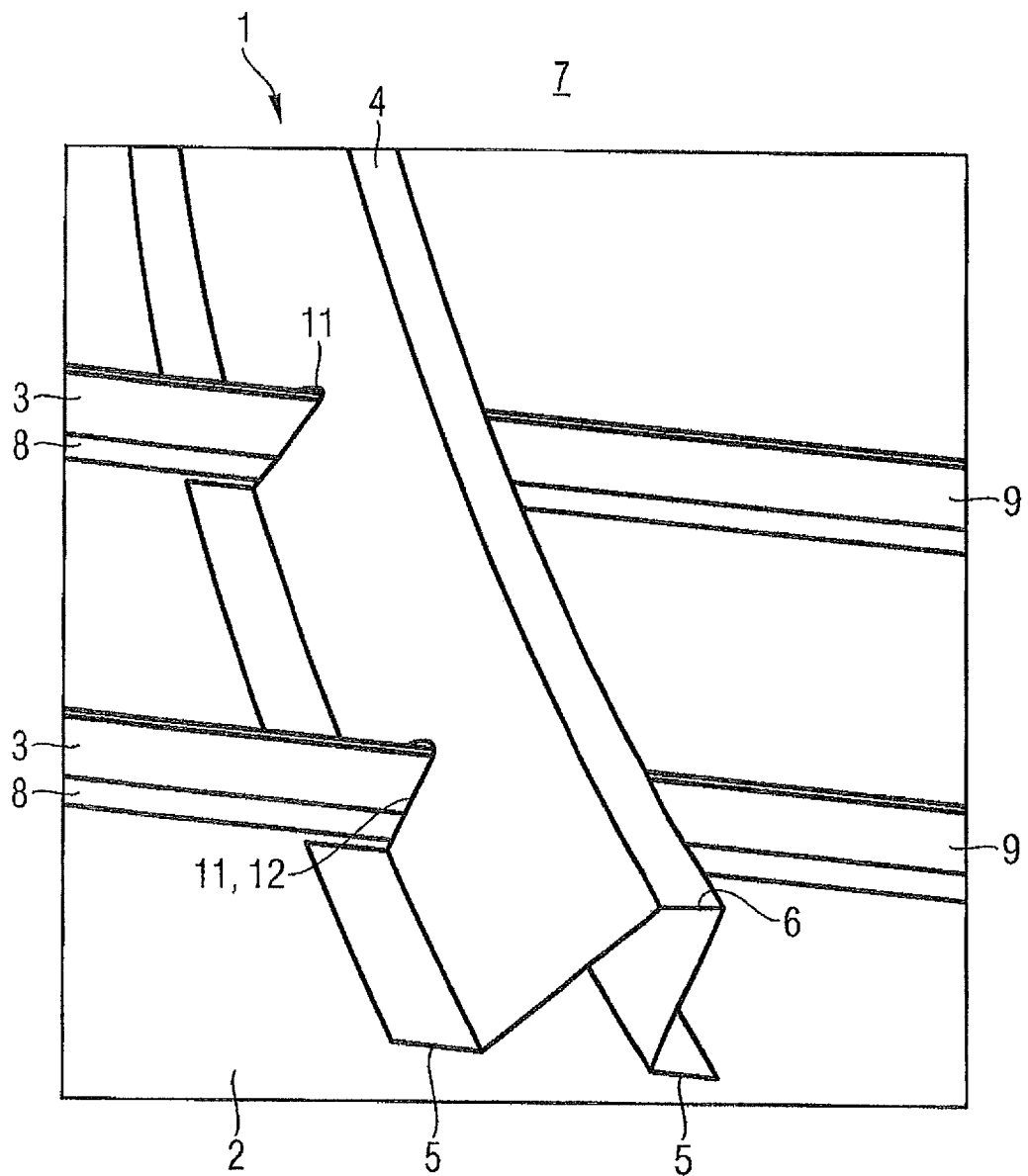

COMPOSITE, AIRCRAFT OR SPACECRAFT, AND METHOD

CROSS-REFERENCES TO RELATED APPLICATIONS

This application is a continuation of and claims priority to PCT/EP2011/067580 filed Oct. 7, 2011 which claims the benefit of and priority to U.S. Provisional Application No. 61/391,334, filed Oct. 8, 2010, and of the German patent application No. 10 2010 042 186.3, filed Oct. 8, 2010, the entire disclosures of which are incorporated herein by reference.

FIELD OF THE INVENTION

The present invention concerns a composite, an aircraft or spacecraft and a method.

Although applicable to any aircraft or spacecraft, the present invention and the problem on which it is based will be explained in detail with reference to an aircraft.

BACKGROUND OF THE INVENTION

The publication DE 10 2006 060364 B4 describes a skin portion which is strengthened with stringers and formers. While the stringers are directly connected to the skin portion, the formers are arranged at a distance from the skin portion above the stringers, and are attached to the skin portion by means of a plurality of clips.

A composite having the construction described above can hardly be shown to be cost-effective in fibre composite construction. This is in particular related to the clips used. In a typical fuselage for a medium- or long-range aircraft approximately 4000 to 5000 clips of this type are currently used, most of which clips are not geometrically identical. If the sufficiently geometrically similar clips were combined, over 200 different types of clip and a correspondingly large number of production means would still remain.

SUMMARY OF THE INVENTION

A composite for an aircraft or spacecraft is provided, having: a skin portion; a stringer which is connected to the skin portion; and a former made from fibre composite material which is connected to the skin portion and forms an opening therewith, through which opening the stringer extends, substantially transverse to the former.

Furthermore, an aircraft or spacecraft comprising the composite according to the invention is provided.

A method for the production of a composite, in particular of the composite according to the invention, is further provided, having the following stages: joining a stringer to a skin portion; and joining a former made from fibre composite material to the skin portion, the stringer extending through an opening formed between the former and the skin portion.

The idea on which the present invention is based consists in dispensing with the clips known from the prior art and providing in their place a former made from fibre composite material, in such a way that the former forms an opening with the skin portion, through which opening the stringer extends, substantially transverse to the former. In this way, an attachment of the former directly to the skin portion can be provided and at the same time the clips can be dispensed with. In this way, corresponding expenditures for the production and provision of the clips decrease.

Advantageous configurations of the invention are disclosed in the dependent claims.

According to a preferred configuration of the composite according to the invention, the stringer is constructed in a T-shape and/or the former is constructed in an Ω-shape. The Ω-shape is associated with the advantage that a former of this type is comparatively warp resistant. The T-shape of the stringer means that the opening in the former can be kept comparatively small so that the corresponding weakening of the former is only minor.

According to a further preferred configuration of the composite according to the invention, the shape of the opening corresponds substantially to the external geometry of the stringer. This also means that the opening in the former and the corresponding weakening thereof can be kept small.

According to a further preferred configuration of the composite according to the invention, the stringer and/or the former is riveted to the skin portion. This results in a simple production process.

According to a further preferred configuration of the composite according to the invention, the skin portion and/or the stringer are constructed from fibre composite material. For the fibre composite material, carbon-fibre-reinforced plastics material (CFRP) in particular, or also a mixed material of fibre composite and metal, for instance an aluminium/glass-fibre laminate, in particular GLARE, are considered.

According to a preferred configuration of the method according to the invention, the stringer and/or the former is riveted to the skin portion at the joining stage.

According to a further preferred configuration of the method according to the invention, the stringer and/or skin portion is constructed from a fibre composite material. Furthermore, it is preferable that the stringer, the former and/or the skin portion is at least partly cured at the joining stage.

BRIEF DESCRIPTION OF THE DRAWING

The drawing is as follows:

FIG. 1 an isometric view of a composite according to an embodiment of the present invention

DETAILED DESCRIPTION OF THE INVENTION

The invention will be explained in greater detail hereinafter by way of embodiments with reference to the appended figure of the drawing.

The figure shows a composite 1 according to an embodiment of the present invention.

The composite 1 comprises a skin portion 2, stringers 3 and a former 4.

The skin portion 2 is preferably constructed from a fibre composite material, in particular CFRP. The skin portion 2 forms, for example, an outer skin of a fuselage barrel of an aircraft generally denoted by 7.

The stringers 3 have, for example, a T-shaped cross-section. The stringers 3 can, for example by a foot portion thereof, be attached, in particular riveted, to the skin portion 2, while a web portion 9 of said stringers projects upwards from the foot portion 8 and skin portion 2. The stringers 3 are preferably constructed from a fibre composite material, for example CFRP.

The former 4 preferably has an Ω-shaped cross-section (also shown partly as A-shaped). The Ω-shaped cross-section is composed of foot portions 5 and a comb 6. The former 4 is preferably rigidly attached, in particular riveted, to the skin portion 2 by means of the foot portions. For the riveting, "Kiss-bond-rivets" in particular are considered. The former 4 is constructed from a fibre composite material, for example CFRP.

The former 4 is formed with a plurality of openings 11. A respective opening 11 extends through the foot portions 5 and partly into the comb portion 6. One of the stringers 3 extends through each opening 11. This means that the stringers 3 extend, substantially transverse to the former 4, through said former. In this case, the openings 11 are formed in such a way that in each case they correspond substantially to the external geometry of the stringers 3. A gap 12 between a respective stringer and the former 4 in the region of the opening 3 can consequently be minimised or even closed.

The following briefly explains the production method of the composite 1:

Firstly, the skin portion 2 is prepared. In this case, it can be partly or completely cured. In the present case "cured" always refers to the matrix, in particular an epoxy resin matrix, in the fibre composite material. A thermoplastic matrix is also possible.

After this, partly or completely cured stringers 3 are placed with their respective foot portions 8 on the skin portion 2 and attached, in particular riveted, to the skin portion 2.

In a further stage the former 4 is formed with the openings 11 and placed on the skin portion 2 with the foot portions 5 of said former in a partly or completely cured state.

After this, the foot portions 5 of the former 4 are attached, in particular riveted, to the skin portion 2.

Depending on whether the stringers 3, the former 4 and the skin portion 2 are only partly cured, the entire composite 1 is subsequently cured under pressure and/or heat.

Although the invention has been described herein by way of preferred embodiments, it is in no way limited thereto, but can be modified in various ways. In particular, the above-described embodiments and configurations of the composite according to the invention can be applied accordingly to the aircraft or spacecraft according to the invention and the method according to the invention, and vice versa. In the present document, the term "a" does not exclude a plurality.

What is claimed is:

1. A composite for an aircraft or spacecraft, comprising:
    a skin portion;
    a stringer which is attached to the skin portion, wherein the stringer is constructed in a T-shape and comprises a foot portion and a web portion, wherein the foot portion and the web portion each form a closed wall; and
    a former made from fibre composite material, which is attached to the skin portion and forms an opening therewith, through which the stringer extends completely with the foot portion and the web portion, substantially transverse to the former, wherein the only material disposed within the former is the transversely positioned stringer, wherein the former is constructed as a hollow Ω-profile with closed side-walls, wherein each of the closed side-walls is provided with the opening through which the stringer extends completely with its foot portion and its web portion, wherein a foot portion of the former is side by side with the foot portion of the stringer, and wherein the stringer is arranged to contact the skin portion and is riveted to the skin portion, but not fixed to the former.

2. The composite according to claim 1, wherein the shape of the opening corresponds substantially to the external geometry of the stringer.

3. The composite according to claim 1, wherein the stringer and the former is riveted to the skin portion.

4. The composite according to claim 1, wherein the skin portion and/or the stringer are constructed from fibre composite material.

5. An aircraft or spacecraft, comprising a composite according to claim 1.

6. A method for producing a composite, in particular the composite according to claim 1, the method comprising:
    joining a stringer to a skin portion, wherein the stringer is constructed in a T-shape and comprises foot portion and a web portion, wherein the foot portion and the web portion each form a closed wall, and wherein the stringer is arranged to contact the skin portion, but not fixed to the former, and is riveted to the skin portion; and
    joining a former made from fibre composite material to the skin portion such that the stringer extends completely with the foot portion and the web portion through an opening formed between the former and the skin portion,
    wherein the former is constructed as a hollow Ω-profile with closed side-walls, wherein each of the closed side-walls is provided with the opening through which the stringer extends completely with its foot portion and its web portion, wherein the only material disposed within the former is the transversely positioned stringer, and wherein a foot portion of the former is side by side with the foot portion of the stringer.

7. The method according to claim 6, wherein the stringer and/or the former is riveted to the skin portion at the joining stage.

8. The method according to claim 6, wherein the stringer and/or the skin portion is constructed from a fibre composite material and the stringer, former and/or the skin portion is at least partly cured at the joining stage.

* * * * *